United States Patent
Kuntze-Fechner et al.

(10) Patent No.: US 8,926,288 B2
(45) Date of Patent: Jan. 6, 2015

(54) ROTOR BLADE IN FLAT DESIGN

(75) Inventors: Gerald Kuntze-Fechner, Waakirchen (DE); Elif Ahci, Munich (DE); Christine Muller, Munich (DE); Alois Wagner, Dietramszell (DE)

(73) Assignee: Airbus Helicopters Deutschland GmbH, Donauworth (DE)

( * ) Notice: Subject to any disclaimer, the term of this patent is extended or adjusted under 35 U.S.C. 154(b) by 961 days.

(21) Appl. No.: 12/754,873

(22) Filed: Apr. 6, 2010

(65) Prior Publication Data

US 2010/0303628 A1    Dec. 2, 2010

(30) Foreign Application Priority Data

May 27, 2009 (EP) ..................................... 09400025

(51) Int. Cl.
*B64C 11/20* (2006.01)
*B64C 27/48* (2006.01)
*B64C 27/473* (2006.01)

(52) U.S. Cl.
CPC ......... *B64C 27/48* (2013.01); *B64C 2027/4736* (2013.01)
USPC .................... 416/229 R; 416/204 R; 416/239

(58) Field of Classification Search
CPC .......... B64C 11/08; B64C 11/10; B64C 27/48
USPC ....... 416/204 R, 207, 210 R, 229 R, 239, 234
See application file for complete search history.

(56) References Cited

U.S. PATENT DOCUMENTS

| 3,321,019 A | * | 5/1967 | Dmitroff et al. | ........... 416/229 R |
| 4,110,056 A | * | 8/1978 | Stevenson | ...................... 416/230 |
| 4,304,525 A | * | 12/1981 | Mouille | ..................... 416/134 A |
| 4,352,632 A |  | 10/1982 | Schwarz et al. | |
| 5,439,353 A | * | 8/1995 | Cook et al. | ..................... 416/230 |

FOREIGN PATENT DOCUMENTS

| GB | 2 131 373 |   | 6/1984 |
| GB | 2131373 A | * | 6/1984 |

OTHER PUBLICATIONS

European Search Report dated Dec. 10, 2009, from corresponding European application.

* cited by examiner

*Primary Examiner* — Dwayne J White
*Assistant Examiner* — Adam W Brown
(74) *Attorney, Agent, or Firm* — Brooks Kushman P.C.

(57) ABSTRACT

A rotor blade (1), in particular of a main rotor of a rotary-wing aircraft, made of fiber-reinforced plastic includes a blade section (10) and a connecting section (12) for fastening the rotor blade (1) to a drive device (18) which includes a sleeve-shaped connecting device (14), is further developed in that the connecting device (14) includes flat fiber layers (S1 to S18) running substantially in the plane of extension of the connecting section (12).

15 Claims, 3 Drawing Sheets

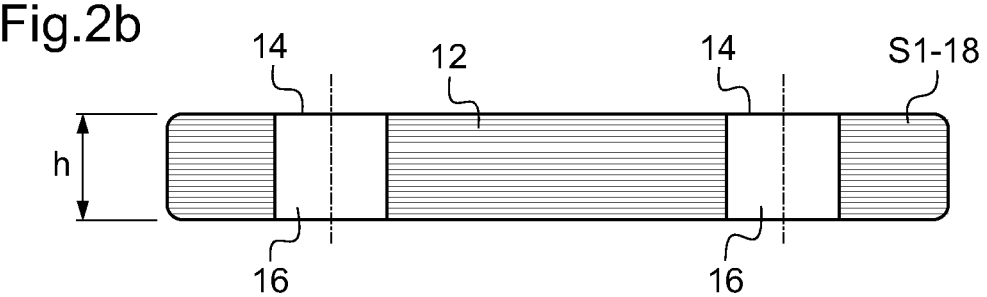
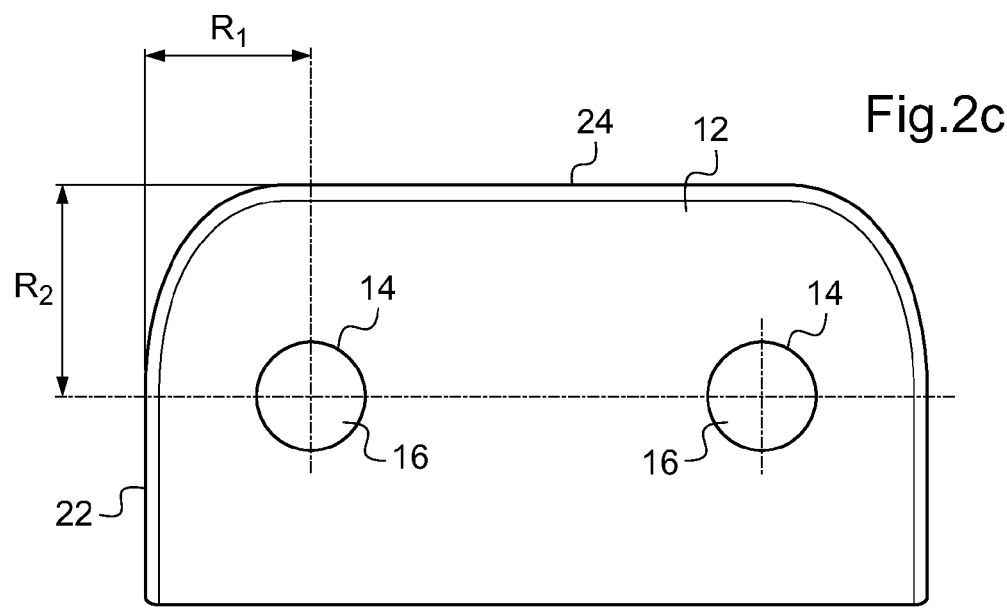
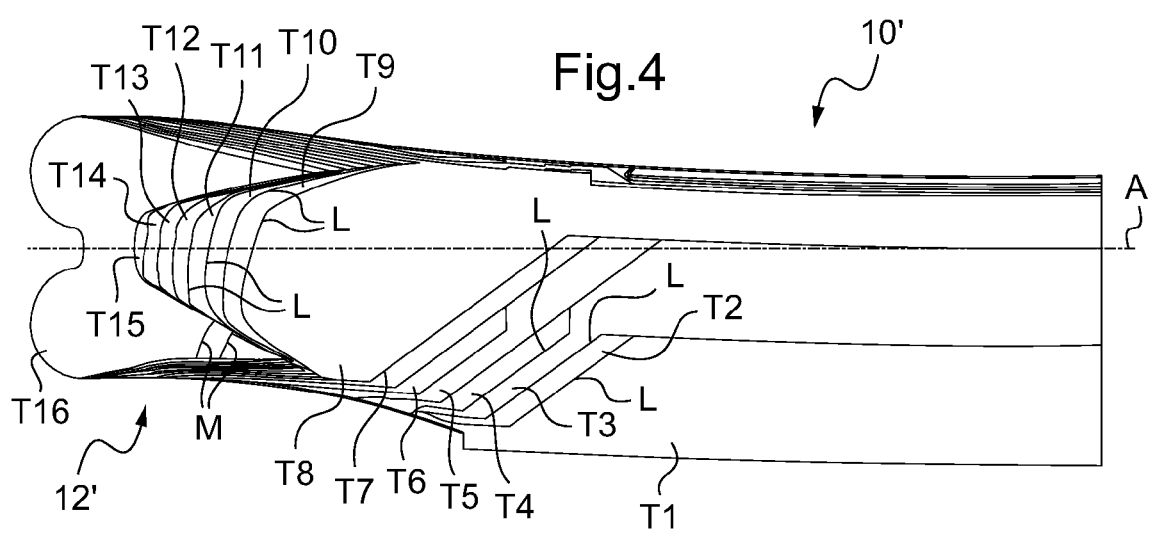

ROTOR BLADE IN FLAT DESIGN

CROSS-REFERENCE TO RELATED APPLICATIONS

This application claims priority to European patent application 09 400025.4 filed May 27, 2009, the contents of which is incorporated in its entirety by reference herein.

BACKGROUND OF THE INVENTION

1. Field of the Invention

The invention relates to a rotor blade, in particular of a main rotor of a rotary-wing aircraft or helicopter, made of fibre-reinforced plastic. This comprises a blade section and a connecting section for fastening the rotor blade to a drive device. The connecting section comprises a sleeve-shaped connecting device and lies at the end of the rotor blade opposite to the blade tip and therefore facing a drive axis. It connects the rotor blade at least indirectly to the drive device. For this it comprises at least one sleeve-shaped connecting device, for example, for a bolt connection. The rotor blade more favourably has two sleeve-shaped connecting devices which are disposed adjacent to one another in the plane of rotation of the blade since tilting moments of the blade from its forward travel or as a result of its inertia can be absorbed.

2. Description of Related Art

Nowadays rotor blades are usually manufactured using the wet or prepreg method of construction. This offers a low degree of automation and is associated with a large amount of manual work and is as a result very cost-intensive and liable to error. Even small improvements of the rotor blade or its method of manufacture can therefore have a cost-reducing or quality-enhancing effect. The development of new rotor blade systems is primarily directed towards reducing the power requirement, the weight and the maintenance expenditure as well as towards increasing the lifetime and reducing the manufacturing costs. The lifetime is substantially determined by the introduction of forces and the transmission of forces between the rotor blade and the drive device. The introduction of forces into the rotor blade is usually effected via loop and bolt connections which are dynamically highly loaded. Loop connections are regarded as solutions appropriate to fibres. It is found, however, that their operating strength is determined by the resin properties. As a result, additional structural-2-elements can be required to increase the dynamic strength. Bolt connections have provided useful as detachable connections. They make it possible, inter alia, to form a folding hinge which is used primarily in the military area.

GB-A 2 131 373 discloses a rotor blade for a main rotor of a rotary-wing aircraft, made of fibre-reinforced plastic comprising a blade section and a connecting section for fastening the rotor blade to a drive device which comprises a sleeve-shaped connecting device with flat fibre layers running substantially in the plane of extension of the connection section. An axial-radial elastomeric bearing is incorporated in the blade root for connection of the rotor blade.

BRIEF SUMMARY OF THE INVENTION

It is therefore the object of the invention to further simplify the manufacture of a rotor blade of the type specified initially.

This object is achieved in a rotor blade of the type specified initially in that the connection device comprises flat fibre layers running substantially in the plane of extension of the connecting section or consists thereof. The connecting section of the rotor blade extends substantially in its plane of rotation. According to the invention, said section is formed from fibre layers likewise extending in the plane of rotation or from a corresponding fibre package. The invention therefore goes away from forming a loop-shaped connecting device by a so-called standing loop in which the fibre layers forming the loop stand perpendicularly to the plane of rotation of the rotor blade. Rather, when forming the loop- or sleeve-shaped connecting device, it follows the principle of the bearing stress connection of fibre layers located in the plane of rotation. This therefore makes it possible to achieve a very flat connecting section having only a small overall height. Thus, the connecting section has a lower aerodynamic resistance.

According to an advantageous embodiment of the invention, the fibre layers forming the connecting section comprise both unidirectional layers and also additional fibre layers running pivoted at an angle with respect to these. The alignment of the fibres in the unidirectional fibre layers corresponds to the longitudinal direction of the rotor blade. The unidirectional fibre layers can therefore in particular transmit the centrifugal forces of the rotor blade optimally and in a material-saving manner. The fibres of the additional layers can run as additional reinforcing layers between the unidirectional fibre layers at an almost arbitrary angle, for example of +/−30, +/−45, +/−60 or 0/90 degrees. They can comprise approximately 50-60% unidirectional fibre layers, 35-45% of +/−45 degree fibre layers and about 5-10% of 0/90 fibre layers. These additional layers can also be formed with biaxial or triaxial scrims or fabrics. The additional fibre layers can be provided in the connecting section in the same or different fractions to the unidirectional fibres between them. Thus, the entire cross-section in the connection zone can be filled with fibre material.

According to a further advantageous embodiment of the invention, the unidirectional layers run into the blade section of the rotor blade. They thus form a component both of the connecting section and of the blade section. There they can run continuously to the blade tip. In particular, they can form spars of the blade section which run in the longitudinal direction of the blade and form the leading edge of the blade. They thereby ensure a good connection of the blade section to the connecting section. The additional layers can also run at least partly into the blade section and contribute to its formation. Layers of the blade skin can also be tied into the connecting section. However, the continuous course of the unidirectional layers has the advantage compared to this that they run in accordance with the force flow and the direction of the centrifugal force and consequently transmit this with minimal usage of material into the connecting section in the best possible manner.

According to a further advantageous embodiment of the invention, the unidirectional fibre layers which tie into the blade section of the rotor blade, are predominantly disposed in a near-surface region of the connecting device. They therefore surround the additional or reinforcing layers, with the result that the connecting section experiences an increase in its bending stiffness and an improvement in its strength properties.

According to a further advantageous embodiment of the invention, the connecting section comprises additional reinforcing layers running at an angle of substantially 90 degrees with respect to the longitudinal axis of the rotor blade. The strength of the connecting sections can also be further improved by this means.

According to a further advantageous embodiment of the invention, all the fibre layers comprise fabric or scrim having a glass fibre and a carbon fibre component. The rotor blade and in particular its connecting section are therefore constructed in a mixed design of glass and carbon fibres which combined the advantages of both materials.

The sleeve-shaped connecting device is therefore formed according to the invention according to the principle of a bearing-stress connection. This means that the fibre layers in the area of bolt connection are interrupted by a sleeve-shaped gap. The gap can, as in the prior art, be omitted by incorporating the fibre layers of the rotor blade in the connecting section. According to an advantageous embodiment of the invention, the sleeve-shaped connecting device is formed by holes substantially perpendicular to the plane of extension of the connecting section. The hole leads to a bearing-stress connection which loads the fibre layers of the connecting section during operation more or less exclusively in their plane of extension and therefore optimally appropriate to the fibres. When a force is introduced via a bolt, as a result of the bearing stress connection, instead of a standing loop according to the prior art, there is no longer any deflection of forces into the fibre layers which could lead to delaminations and cracks in the loop. Rather, the loaded fibre layers run almost free from deflection between the connecting section and the rotor blade. As a result, a maximum load-bearing capacity is in turn possible with minimal material usage. This favours cost-effective production, long lifetime, small thickness dimension of the connecting section and a low weight of the rotor blade.

According to a further advantageous embodiment of the invention, the connecting device has a liner-shaped metal reinforcement. As a result, on the one hand, the introduction of force into the connecting section in fibre composite design can be improved and made more uniform and on the other hand, the wear of the connecting device can be reduced.

According to a further advantageous embodiment of the invention, the edge distances of the sleeve-shaped connecting device in and at right angles to the longitudinal axis of the rotor blade are different. Thus, the different cases of failure of the bearing stress connection can be countered. In the longitudinal direction of the blade, by dimensioning the edge distance of the connecting device at the front side, a sufficient shear strength can be achieved to prevent tearing out of the connecting device due to shear failure. The edge distance of the connecting device to the side edge running in the longitudinal direction of the blade possibly together with a distance from one another, determines its tensile strength in order to eliminate cheek rupture. The lateral edge distance can be kept somewhat lower by a somewhat higher fraction of unidirectional fibre layers.

BRIEF DESCRIPTION OF THE SEVERAL VIEWS OF THE DRAWINGS

The principle of the invention will be described in further detail hereinafter with reference to a drawing as an example. In the drawings:

FIG. 4 shows a sectional view of a further embodiment of a rotor blade.

DETAILED DESCRIPTION OF THE INVENTION

Figure 1A:
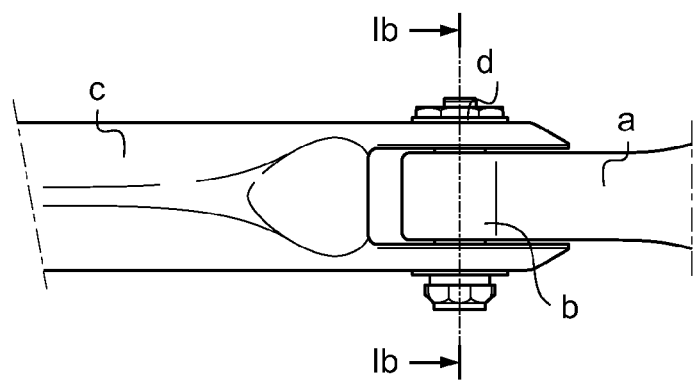
FIG. 1 shows a load connection according to the prior art.

FIG. 1 shows the prior art. For this purpose, FIG. 1a shows a section of a rotor system at the position of the rotor blade connection. A blade section a, which can be immediately identified, goes over into a connecting section b in which a loop connection is formed. This forms the interface to a drive device c which embraces the connecting section b in a fork shape. A bolt d connects the device c to the connecting section b.

Figure 1B:
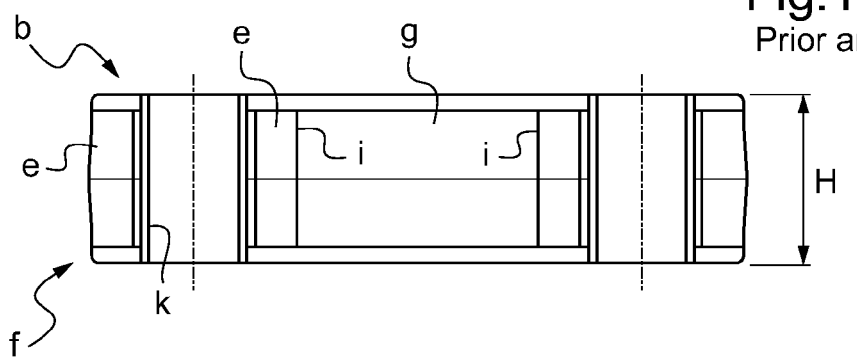

FIG. 1b shows a sectional view according to FIG. 1a in the area of the bolt d. The blade section consists of endless glass fibres, so-called rovings e. These are wound in loops f around wound fibre liners k. In the sectional view in FIG. 1b, the planes of the rovings e therefore run parallel to the axial direction of the bolt d and the liners k or perpendicular to the plane of extension of the connecting section b. They form the "standing" loops f which give the connecting section b a height H. Between these is an intermediate space g which is filled with horizontally coated fibre material or a chopped fibre mass. Thus, an unfavourable dividing surface i is formed between the loops f and the fibre material of the intermediate space g.

Figure 2A:
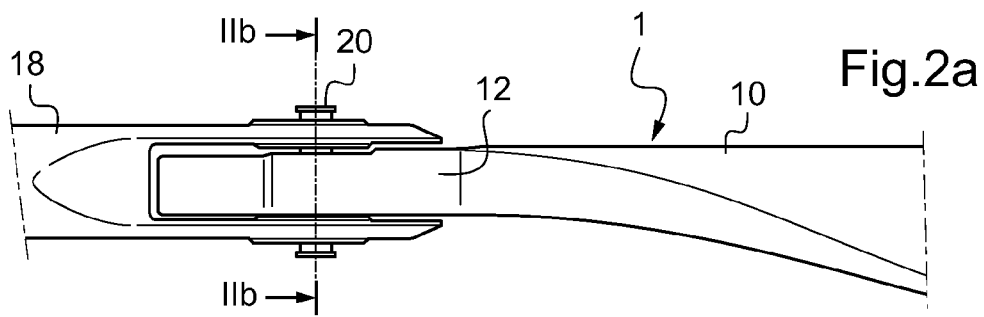
FIG. 2 shows a connecting section according to the invention.

Comparable views are shown in FIG. 2. In FIG. 2a a short part of the blade section 10 can be identified from the rotor blade 1, which goes over into the connecting section 12. This is embraced by a fork-shaped interface of a drive device 18 to which it is detachably fastened by means of a detachable bolt 20.

FIG. 2b shows a sectional view according to FIG. 2a through the connecting section 12. This is exclusively formed by fibre layers S1 to S18 coated horizontally one above the other. The connecting devices 14 form two perpendicularly running holes 16 which pass through the fibre layers S1 to S18. The superposed fibre layers S1 to S18, forming the connecting section 12, together have a thickness h.

The holes 16 are only drilled subsequently in the connecting section 12. This results in a very uniform and homogeneous formation of the regular cylindrical bearing stress of the holes 16 whereon their subsequent production can be identified without any doubts. Due to the undisturbed reveal formation, the remaining cross-section of the connecting section 12 is fully loadable as far as the edges of the bores 16, resulting in an optimal utilisation of the cross-section and therefore minimal dimensions of the connecting section 12. The holes 16 pass through the fibre layers S1 to S18 of the connecting section 12 perpendicularly to their plane of extension and therefore load these optimally in a manner appropriate to the fibres. During introduction of force via the bolts 20, due to the bearing stress connection of the holes 16, there is no deflection of force into the fibre layers S1 to S18 which could lead to delaminations in the connecting section 12. As a result, a maximum load-bearing capacity can be achieved with minimal material usage. This favours cost-effective production, long lifetime, small external dimension and a low weight of the rotor blade 1.

In the plan view of the connecting section 12 according to FIG. 2c, it can be identified that the holes 16 have a shorter edge distance $R_1$ from the side edge 22 of the connecting section 12 compared to its front side 24 (edge distance $R_2$). The method of production according to the invention makes it possible to achieve a material-saving adaptation of the connecting section 12 to the ensuing loads. Shear failure of the bearing stress connection due to tearing out of at least one of the holes 16 in the longitudinal direction of the blade is countered by a sufficiently dimensioned edge distance $R_2$. Together with the height h of the connecting section 12, this defines the two transmission surfaces for shear stresses per hole 16. The layers with cross-running fibres in particular absorb this loading.

A failure of the connecting section 12 in the direction transverse to the longitudinal direction of the blade through the two holes 16, i.e. a "cheek rupture" would correspond to a tensile failure. The cross-section thereby loaded is calculated from the width of the connecting section 12 multiplied by its height h minus the loaded bearing stress surfaces of the holes 16. Since sufficiently loadable cross section is available between the holes 16, the edge distance $R_1$ can be smaller. The tensile loading is substantially absorbed by the unidirectional layers S2, S3, S5, S7 and S8 (cf. FIG. 3).

The side views or sectional views according to FIG. 1a or 1b and 2a or 2b illustrate another advantage of the method of construction according to the invention: the connecting section 12 having a height h of about 36 mm is significantly smaller than that of the prior art having a height H of about 58 mm. Since the thickness H or h determines the region of the connecting section b or 12 exposed aerodynamically to the incoming flow, the connecting section 12 according to the invention offers significantly lower aerodynamic resistance.

Figure 1C:
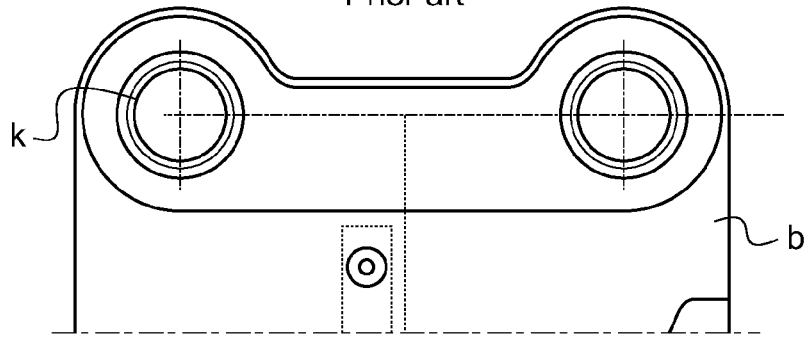

In the plan views according to FIG. 1c or 2c, on the other hand, the larger dimensions in the plane of extension of the connecting section 12 are clear. With comparable load-bearing capacity, the edge distance $R_2$ according to the invention is approximately one and a half times as large as in the prior art. The edge distance $R_1$ is also larger. However, since these dimensions extend in the aerodynamically non-effective plane of rotation and the rotor blade connection in this plane is scarcely subjected to any constructive restrictions, these enlarged dimensions can be accepted.

Figure 3:
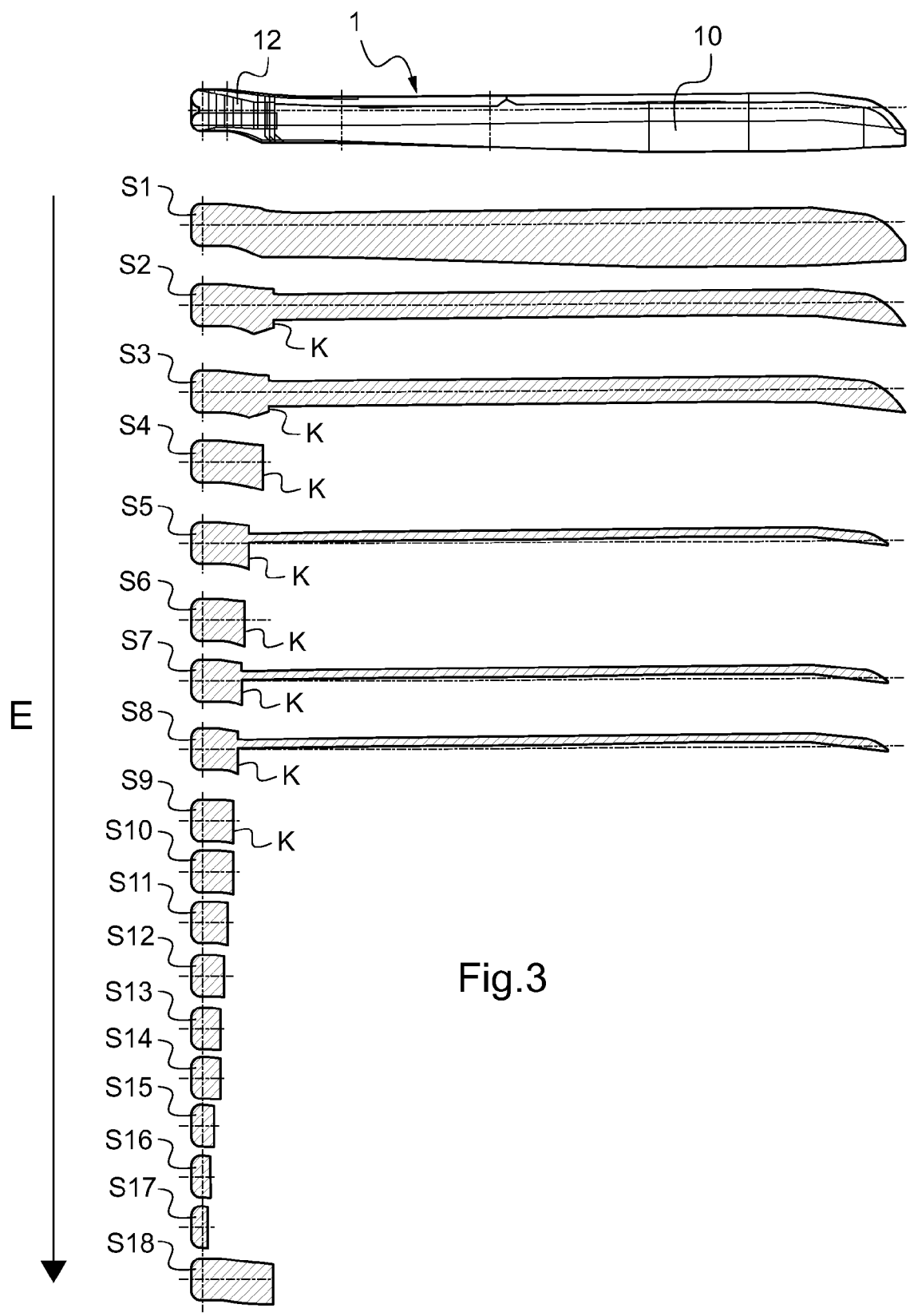
FIG. 3 shows fibre layers for forming a rotor blade together with connecting section.

FIG. 3 shows an example for a sectional and laying plan of the fibre layers S1 to S18. In the direction of the arrow E, these are inserted in a production mould for a resin injection method in order to form the lower shell of a rotor blade 1. The layer S1 to be laid first in the mould consists of a multi-axial fabric having an angular alignment of +/−45 degrees with respect to the longitudinal axis of the rotor blade 1 and forms the lower blade skin. The following layers S2 and S3 are unidirectional fibre layers forming parts of a spar of the rotor blade 1. These run flat and rectangularly in the blade section 10 and expand abruptly in the connecting section 12 on its base surface.

The layer S4 is a reinforcing layer consisting of a triaxial fabric. This no longer fills the entire connecting section 12 as shown by a comparison with the layer S3.

The following layer S5 again consists of unidirectional fibre material. This extends through the entire blade section 10 and expands in the connecting section 12 on its width. This likewise forms a part of the spar in the rotor blade 1. This also no longer fills the entire length of the connecting section 12 in the longitudinal direction of the rotor blade 1. This is followed by the layers S6 to S8 correspondingly.

Unlike the previous principle, the layer S10 forms a reinforcing layer consisting of unidirectional fibre material. In contrast to the previous layers S2, S3, S5, S7 and S8 of unidirectional fibre material, this is not involved in forming the spar in the rotor blade 1. The following layers S11 to S18 are also reinforcing layers which, with the exception of the last layer S18, no longer fill the complete connecting section 12.

The layers S1 to S3 as well as S5, S7 and S8 form a lower shell of the blade section 10 and are guided further in the connecting region 12 of the rotor blade 1. There they are, as it were, fanned out by providing the reinforcing layers S4, S6, S9 to S18 in between and to this end.

FIG. 3 shows fibre layers S2 to S18, whose transition from the connecting section 12 into the blade section 10 runs almost at right angles to the longitudinal axis of the blade. At the transition, they each have an edge K which runs largely at right angles to the longitudinal axis A of the blade and jumps back from layer to layer. The staggered arrangement of the edges K results in a soft transition from the connecting section 12 into the blade section 10 without a stiffness jump.

FIG. 4 shows in sectional view a further embodiment with the fibre layers T1 to T16 following the fundamental structure according to FIG. 3 but the layers T2 to T16 have a modified form with regard to the transition between the connecting section 12' into the blade section 10': their edges L, of which only those of layers T2 to T4 are designated as an example, do not run at right angles in layers T2 to T8 but at least partially at an inclination to the longitudinal axis A of the blade. The edges L of the layers T9 to T16 on the other hand have a type of recess which is almost symmetrical to the longitudinal axis A. Its form is therefore similar to that of a tooth root. The tips of the layers T15 and T16 are cut off so that they additionally acquire an edge M which is inclined to the axis A.

The edges L are also like the edges K (cf. FIG. 3). This prevents abrupt stiffness transitions and thus improves the strength behaviour of the connection. Due to the staggered recesses of the layers T9 to T16, a cavity is formed which is filled with a foam core or the like. The layer T16 is followed by at least one other layer which was not shown because this would cover the arrangement identifiable in FIG. 4.

Since the preceding rotor wing which has been described in detail comprises an exemplary embodiment, it can be broadly modified in the usual manner by the person skilled in the art without departing from the scope of the invention. In particular, the specific cut of the fibre layers and the sequence of their arrangement can be effected in a different form to that described here. Likewise, the mechanical coupling to the connecting section can be configured in a different form if this is necessary for reasons of space or design reasons. Furthermore, the use of the indefinite article "a" or "an" does not exclude the fact that the relevant features can also be multiply present.

REFERENCE LIST a Blade section
b Connecting section
c Drive device
d Bolt
e Roving
f Loops
g Intermediate space
i Dividing surface
k Liners
1 Rotor blade
10, 10' Blade section
12, 12' Connecting section
14 Connecting device
16 Hole
18 Drive device
20 Bolt
22 Side edge
24 Front side
A Longitudinal axis of rotor blade
H, h Height
K Edge of layers S2 to S18
L Edge of layers T2 to T16
M Edge of layers T15, T16
$R_1$, $R_2$ Edge distance
S1 to S18 Fibre layers

The invention claimed is:

1. A rotor blade, in particular for a main rotor of a rotary-wing aircraft, made of fibre-reinforced plastic comprising
a blade section, a connecting section for fastening the rotor blade to a drive device which comprises a sleeve-shaped connecting device with flat fibre layers running substantially in the plane of extension of the connection section and at least one bolt introduced substantially perpendicular to the plane of extension of the connecting section for fastening the connecting section to the drive device, characterised in that the connecting section comprises flat fibre layers extending in a transition from the blade section, in which at least one unidirectional fibre layer is inserted between reinforcing layers and does not fill the entire connecting section, the sleeve-shaped connecting device being formed by drilled holes through the connecting section providing a bearing-stress connection with the flat fibre layers of the connecting section being loaded by one bolt for each hole, wherein each of the holes has a first edge distance extending between a side edge of said connecting section and said hole, and a second edge distance extending between a front edge of said connecting section and said hole, the first edge distance being less than the second edge distance;

wherein the front edge and the side edges of the connecting section are provided by an outer perimeter of the connecting section; and wherein a first fibre layer of the flat fibre layers has a concave edge along the outer perimeter of the layer to form a recess opposed to the front edge of the connecting section, the concave edge being generally symmetrical about a longitudinal axis of the rotor blade.

2. The rotor blade according to claim 1, characterised in that the fibre layers comprise unidirectional layers and additional layers running pivoted at an angle with respect to these.

3. The rotor blade as claimed in claim 2, characterised by the unidirectional layers which run pivoted at an angle with respect to the additional layers are disposed in a near-surface zone of the connecting device.

4. The rotor blade according to claim 1, characterised in that unidirectional layers run into the blade section.

5. The rotor blade according to claim 1, characterised in that fibre layers of a blade skin of the blade section are tied into the connecting section.

6. The rotor blade according to claim 1, characterised by reinforcing layers extending between the fibre layers from the blade section, which do not run into the blade section.

7. The rotor blade according to claim 6, characterised by reinforcing layers which run at an angle of substantially 90° with respect to a longitudinal axis of the rotor blade.

8. The rotor blade according to claim 1, characterised by a glass fibre and a carbon fibre fraction in the fibre layers.

9. The rotor blade according to claim 1 wherein a second fibre layer of the flat fibre layers has an inclined edge at an acute angle with the longitudinal axis of the rotor blade and opposed to the front edge of the connecting section.

10. The rotor blade according to claim 9 wherein a third fibre layer of the flat fibre layers has a concave edge forming a recess opposed to the front edge of the connecting section with tips of the layer at either end of the concave edge being cut to form edges M.

11. The rotor blade according to claim 1 wherein the recess forms a cavity within the connecting section, the cavity filled with a foam core.

12. The rotor blade according to claim 1 wherein the recess of the first fibre layer forms a shape of a tooth root.

13. A fibre-reinforced plastic rotor blade for a main rotor of a rotary-wing aircraft, comprising:

a blade section; and a connecting section extending from the blade section and configured to fasten the blade to a drive device, the connecting section comprising flat fibre layers running substantially in the plane of extension of the connection section and extending in a transition from the blade section in which at least a unidirectional fibre layer not filling the entire connecting section is inserted between reinforcing layers, the connecting section having first and second side edges, and a front edge extending between the first and second side edges and positioned to face the drive device, the front edge and the side edges of the connecting section being provided by an outer perimeter of the connecting section, the connecting section defining first and second holes extending perpendicularly through the connecting section;

wherein the first hole is positioned adjacent to the first edge at a first edge distance therefrom, and at a second edge distance from the front edge, the first edge distance being less than the second edge distance;

wherein the second hole is positioned adjacent to the second edge at a third edge distance therefrom, and at a fourth edge distance from the front edge, the third edge distance being less than the fourth edge distance; and wherein one bolt is provided for each of the first and second holes to provide a bearing stress connection with the flat fibre layers of the connecting section loaded by the bolts.

14. The blade of claim 13 wherein each of the first and second holes is configured to cooperate with a respective bolt to fasten the rotor blade to the drive device such that each bolt interfaces with the flat fibre layers along a perimeter of the corresponding hole to form the bearing-stress connection.

15. The blade of claim 13 wherein the first edge distance is generally equal to the third edge distance, and wherein the second edge distance is generally equal to the fourth edge distance.

* * * * *